May 8, 1923.

E. A. HAMMETT

PISTON DRESSING MACHINE

Filed Oct. 10, 1921  2 Sheets-Sheet 1

1,454,834

INVENTOR
Elbert A. Hammett.
BY
ATTORNEY

May 8, 1923.

E. A. HAMMETT

PISTON DRESSING MACHINE

Filed Oct. 10, 1921

INVENTOR
Elbert A. Hammett.
BY
ATTORNEY

Patented May 8, 1923.

1,454,834

UNITED STATES PATENT OFFICE.

ELBERT A. HAMMETT, OF KANSAS CITY, MISSOURI, ASSIGNOR OF ONE-HALF TO BEN B. BELDON, OF KANSAS CITY, MISSOURI.

PISTON-DRESSING MACHINE.

Application filed October 10, 1921. Serial No. 506,545.

*To all whom it may concern:*

Be it known that I, ELBERT A. HAMMETT, a citizen of the United States, residing at Kansas City, in the county of Jackson and State of Missouri, have invented certain new and useful Improvements in Piston-Dressing Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a piston dressing device and the primary object of the invention is to provide an inexpensive, efficient, easily operated device which is adapted to machine the piston ring grooves in the piston as well as to dress the surface of the piston in the event that it is desired to true up the same or to take off a cut from the surface for any purpose.

Means is provided whereby the piston grooves can be machined to form them and to dress off the surface thereof, and the device is also capable of conveniently taking off a cut from the major portion of the piston already formed.

While the device is capable of being used for machining rough pistons, it is primarily intended as a repair device for repairing or restoring pistons to their original condition and it contemplates the provision of an inexpensive mechanism for carrying out the above objects.

The invention consists in certain novel parts and combinations of parts, which will be referred to hereinafter, reference being had to the accompanying drawings, in which—

Figure 1:
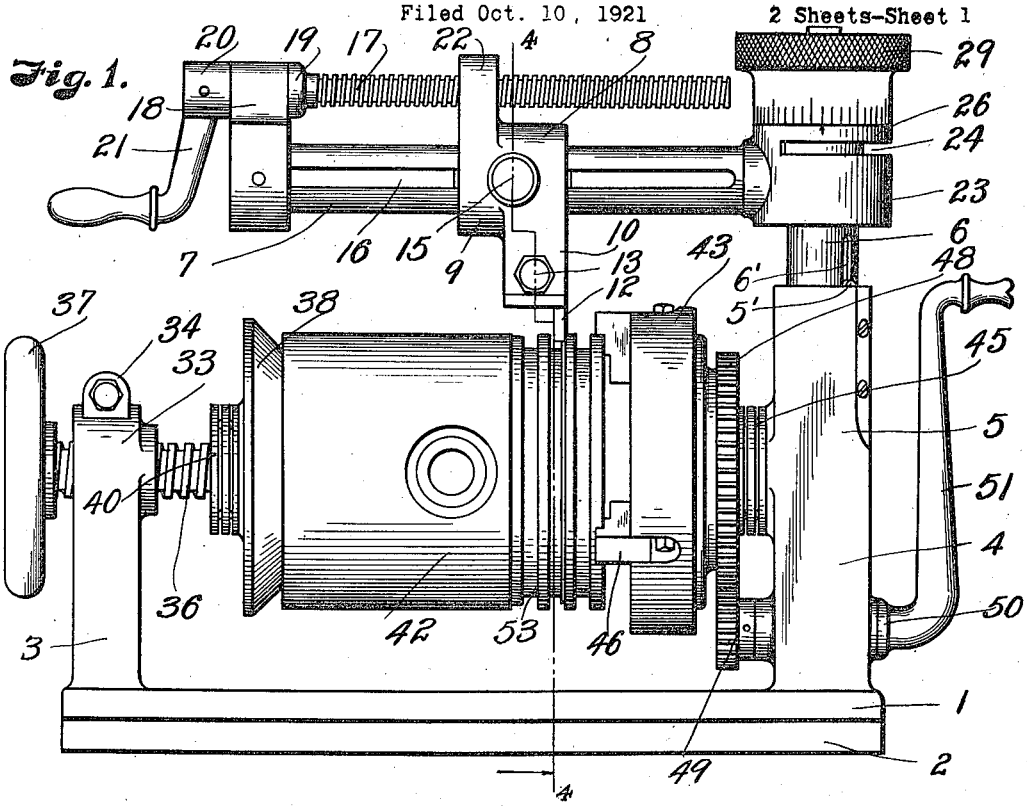
Fig. 1 is a side elevational view of a device constructed in accordance with my invention, showing a piston in the process of being dressed.

The embodiment of the invention selected for illustration is shown as comprising a base 1, having a longitudinal, depending rib 2, adapted to be received between the jaws of a vice so that the device can be readily attached to a machinist's vice common to the conventional bench although it may be supported by any other suitable means.

At the respective ends of the base 1 are standards 3 and 4. The standard 4 has a hollow tubular portion 5 to receive a vertically adjustable sleeve 6 to be guided by the tube 5, the sleeve being held against rotation by the key 5' in the groove 6'. The sleeve 6 carries a lateral guide arm 7 extending longitudinally of the device and it supports a tool clamping block 8. The tool clamping block is shown as consisting of a tubular portion 9 having depending clamping arms 10 and 11 adapted to clamp a cutting tool 12 between them the tool being held between the arms by tension exerted by a screw 13, which may draw the arms or jaws 10 and 11 one toward the other to clamp the tool 12.

The clamping block 8 is held against rotative movement with respect to the cylindrical arm 7 by a pin or stud 14 on the end of the screw 15 which projects through the tubular portion 9 of the block 8 and engages in a longitudinal groove 16 in the arm 7. Means is provided for mechanically adjusting the block along the arm 7 and this means is shown as consisting of a feed screw 17, journaled in a bearing block 18 fast to the free end of the arm 7.

The screw 17 is held against longitudinal movement with respect to the block 18 in one direction by the collar 19 and it is held against movement in an opposite direction by the tubular portion 20 of the crank 21, by means of which the screw can be turned.

Figure 2:
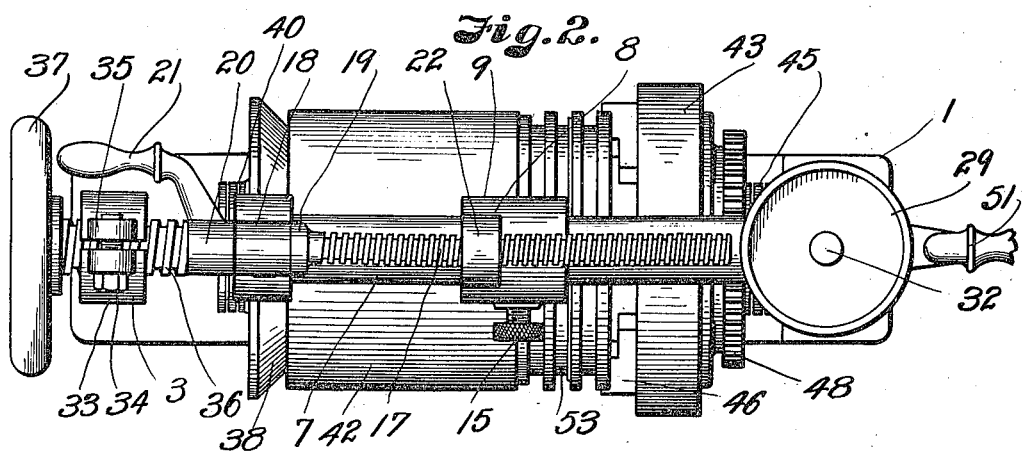
Fig. 2 is a top plan view of the same.
Figure 3:
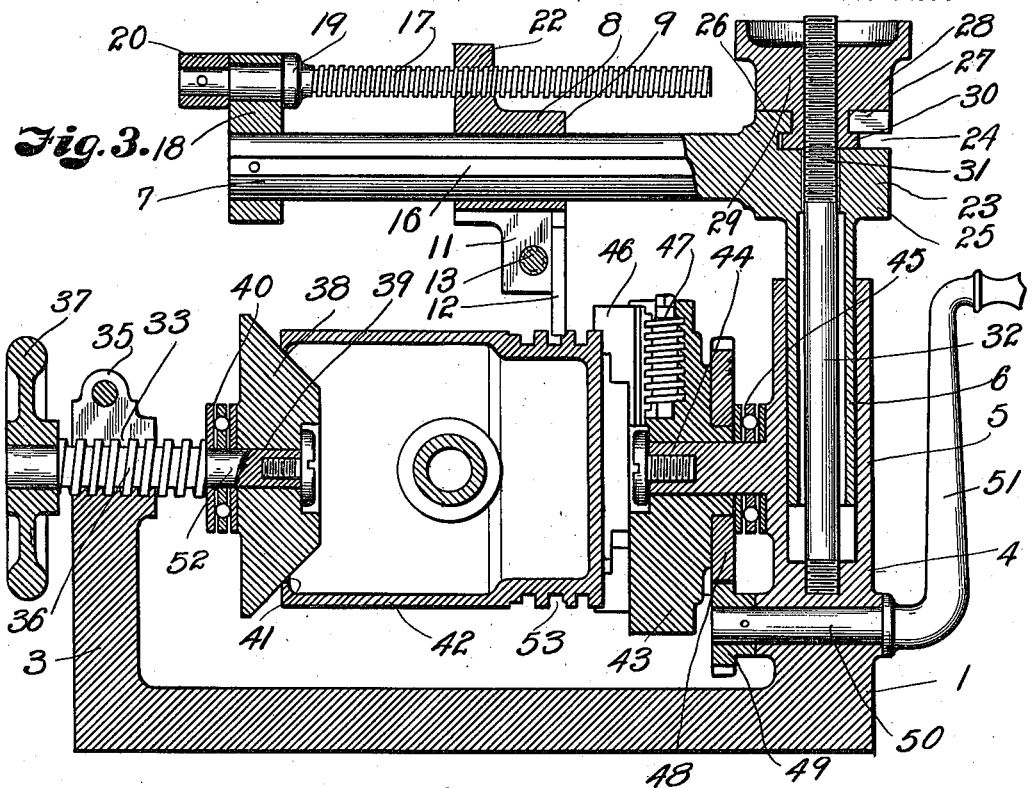
Fig. 3 is a vertical, longitudinal, sectional view through the device and through the piston.
Figure 4:
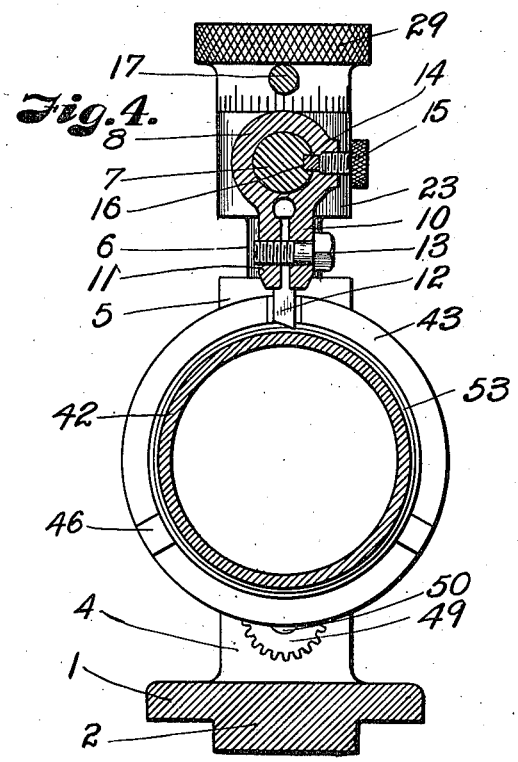
Fig. 4 is a sectional view on the line 4—4 of Fig. 1.
Figure 5:
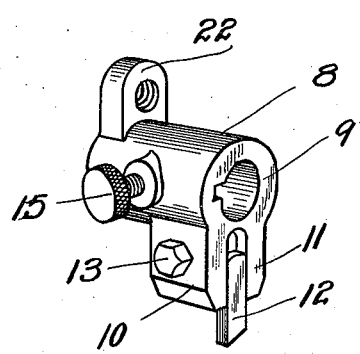
Fig. 5 is a detail, perspective view of the cutting tool and its clamping block.

The threads of the screw engage an internally threaded ear 22 integral with the block 8 and by reference to Figs. 1, 2 and 3 it will be observed that by turning the crank 21, the screw 17 will be effective in moving the block 8 longitudinally of the supporting arm 7, the direction of travel of the block depending upon the direction of rotation of the crank 21.

The elbow 23 which connects the arm 7 to the tubular portion 6 constitutes a head having a transverse slot 24, which divides the head into two parts 25 and 26. The part 26 is provided with a vertical slot 27 to receive the constricted portion 28 of a knurled adjusting nut 29, the flanged portion 30 of the nut being confined within the space 24 so that the nut may turn in the head and whereby the nut will be held in operative position.

The nut engages a threaded portion 31 of an upstanding post 32, fastened in the bottom of the standard 4 and which projects through the tubular portion 5 and the tubular portion 6, as will be clearly seen in Fig. 3. Therefore, when the nut 29 is turned, the head 23 will be moved toward or away from the bottom of the tubular portion 5 to adjust the cutting block 8 toward and away from the work, for example, the engine piston. The engine piston is supported from the standards 3 and 4. The standard 3 is provided with an internally threaded portion 33, formed in the clamping jaws 34 and 35 at the upper extremity thereof, and it carries an externally threaded feed screw 36, having at one end a hand wheel 37 whereby the screw may be turned, the other end of the screw supporting a centering head 38, rotatable about the end 39 of the screw 36 and provided with a thrust bearing 40 of appropriate construction.

The conical shape of the block 38 will permit it to be introduced into the open end 41 of the engine piston 42 so as to center it with respect to the chuck 43 rotatable about the stub shaft 44 carried by the standard 4. The stub shaft 44 also carries an end thrust bearing 45 of appropriate construction, as will be clearly apparent by reference to Fig. 3.

The chuck 43 has radial jaws 46 to clamp the piston 42 and they may be adjusted by adjusting screws 47, as will be well understood by reference to Fig. 3, the form of chuck shown being well known.

The chuck 43 carries a gear 48, which is rigid therewith, and it meshes with a pinion 49 on the crank shaft 40. Therefore, when the crank 51 is rotated, the chuck and the piston will be rotated, the centering block 38 rotating on the shaft portion 52 of the screw 36 and if the cutting tool 12 is adjusted in the grooves 53, the rotation of the piston will cause an appropriate cut or dressing of the piston groove walls. It will be apparent that the cutting tool can be fed along the supporting arm 7 to take off the requisite amount of metal from the piston.

If it is desired to dress the entire surface of the piston, the cutting tool can be progressively fed longitudinally of the piston through the medium of the crank 21 at the same time the piston is being turned through the medium of the crank 51, its shaft 50, pinion 49 and gear 48, causing the chuck 43 to rotate and consequently turning the piston 42.

The depth of the cut in the bottom of the groove can be controlled by turning the nut 29 while the width of the groove will be determined by the feed screw 17 operated from the crank 21.

It will be apparent that whenever it is desired to machine a piston, the hand wheel 37 will be turned to retract the centering block 38 toward the standard 3. Then the piston will be attached to the chuck 43 and the hand wheel 37 will be turned so as to move the centering block 38 into engagement with the open end of the piston 42 so that it will be clamped between the chuck and the centering head 38, ready to turn. The cutting tool will then be adjusted to take off the initial cut by turning the crank 51. The tool 12 will be effective in taking off the desired amount of metal to widen the piston ring groove, increase the depth thereof, or to dress the piston, as the case may be.

What I claim and desire to secure by Letters-Patent is:

1. A piston dressing device comprising a base, standards on said base, a chuck rotatably carried by one standard, a centering device adjustably supported by the other standard and movable toward and away from the chuck to assist the chuck in supporting a piston, a sleeve longitudinally adjustable with respect to one of the standards, an arm thereon and parallel with the axis of the piston supported by the device, a cutting tool holder supported by the arm, the cutting tool holder being longitudinally movable on the arm, and a feed screw for moving the cutting tool holder longitudinally of the arm.

2. A piston dressing device comprising a base, standards carried by opposite ends of the base, one of said standards being hollow, a post in the hollow standard, a sleeve adjustably mounted on the post, an arm extending laterally from the sleeve, a piston cutting tool holder on the arm, a stub shaft projecting from the hollow standard, a chuck rotatably mounted on the stub shaft, a centering device carried by the other standard and adjustable thereon, and means for rotating the chuck.

3. A piston dressing device comprising a base, vertical standards on said base, one of which is hollow and the other of which has a transverse, threaded opening, a centering device adjustable in the transverse, threaded opening of the one standard, a post in the hollow portion of the other standard, a vertically adjustable sleeve in the hollow standard and provided at its upper end with a head having an undercut portion, an adjusting nut engaging the undercut portion of the head and in threaded connection with the sleeve whereby the nut can be turned on the threads of the post to adjust the sleeve vertically with respect thereto, a lateral arm connected to the sleeve by the head, a longitudinally movable cutter block on the arm, a feed screw for adjusting the block on the arm, a rotatable chuck carried by the hollow standard, and means for rotating the chuck.

4. A piston dressing device comprising a base, vertical standards on said base, a stub shaft carried by one of the standards, a chuck loosely mounted to rotate on the shaft, a thrust bearing between the standard and the chuck, a gear fixed to the chuck, means for rotating said gear, a laterally projecting shaft carried by the other standard, a cone-shaped centering device loosely mounted on the shaft, a thrust bearing for the chuck and carried by the shaft, and a cutting tool supporting means adjustable radially and longitudinally with respect to the axes of the chuck and the centering device.

5. A piston dressing device comprising a base, means on the base for supporting a piston, a cutting tool holder carried by the base, and means for adjusting the cutting tool holder longitudinally of and at right angles to the axis of the piston supporting means.

6. A piston dressing device comprising a base, standards at opposite ends of the base, a stub shaft on one standard, a rotatable chuck on the stub shaft, a gear carried by the chuck, a drive shaft, a pinion on the drive shaft meshing with the gear, a centering device supporting shaft carried by the other standard, a cone-shaped centering device loosely mounted on the last mentioned shaft, the axis of which is in line with the axis of the chuck, and a cutting tool carrying block having adjustment longitudinally of the axis of the chuck and at right angles thereto.

In testimony whereof I affix my signature.

ELBERT A. HAMMETT.